US012574699B2

(12) United States Patent
Kotulla et al.

(10) Patent No.: US 12,574,699 B2
(45) Date of Patent: *Mar. 10, 2026

(54) VEHICLE, COMPRISING A VEHICLE CABIN DEFINING AN ACOUSTIC SPACE

(71) Applicant: ASK INDUSTRIES GMBH, Niederwinkling (DE)

(72) Inventors: Daniel Kotulla, Mitterfels (DE); James Rex, Offenberg/Neuhausen (DE)

(73) Assignee: Ask Industries GmbH, Niederwinkling (DE)

( * ) Notice: Subject to any disclaimer, the term of this patent is extended or adjusted under 35 U.S.C. 154(b) by 74 days.

This patent is subject to a terminal disclaimer.

(21) Appl. No.: 18/511,866

(22) Filed: Nov. 16, 2023

(65) Prior Publication Data

US 2024/0089693 A1 Mar. 14, 2024

Related U.S. Application Data

(63) Continuation of application No. 17/626,091, filed as application No. PCT/EP2019/068601 on Jul. 10, 2019, now Pat. No. 11,882,427.

(51) Int. Cl.
*H04S 7/00* (2006.01)
*G10K 15/08* (2006.01)

(52) U.S. Cl.
CPC .............. *H04S 7/305* (2013.01); *G10K 15/08* (2013.01)

(58) Field of Classification Search
CPC .......... H04R 2499/13; H04R 2227/007; H04S 7/305; H04S 7/30; G10K 15/08
USPC ..................... 381/63, 86, 61, 302, 71.4, 365
See application file for complete search history.

(56) References Cited

U.S. PATENT DOCUMENTS

| | | | | |
|---|---|---|---|---|
| 6,091,824 A * | 7/2000 | Lin | G10H 1/0091 | 84/630 |
| 6,105,443 A * | 8/2000 | Sakai | G01H 17/00 | 73/865.6 |
| 2008/0031468 A1* | 2/2008 | Christoph | G10K 11/17854 | 381/71.2 |
| 2019/0208352 A1* | 7/2019 | Trestain | G01H 7/00 | |

FOREIGN PATENT DOCUMENTS

| | | |
|---|---|---|
| CN | 2643592 | 9/2004 |
| CN | 1722912 | 1/2006 |
| CN | 1748442 | 3/2006 |
| CN | 1759635 | 4/2006 |
| CN | 103262163 | 8/2013 |
| CN | 105959875 | 9/2016 |
| CN | 106664473 | 5/2017 |
| TW | I640983 | 11/2018 |

* cited by examiner

*Primary Examiner* — Norman Yu
(74) *Attorney, Agent, or Firm* — Rimon PC

(57) ABSTRACT

Vehicle (1), comprising a vehicle cabin (2) defining an acoustic space having specific aurally perceivable properties in a reference state, comprising an apparatus (3) for outputting an audio signal (4) in the vehicle cabin (2), characterized in that the apparatus (3) for outputting an audio signal (4) in the vehicle cabin (2) comprises:

an audio outputting device (6) configured to output an audio signal (4) in the vehicle cabin (2);

an acoustic impression modifying device (8) configured to generate an acoustic space modification signal (9) allowing for modifying the aurally perceivable properties of the acoustic space defined by the vehicle cabin (2) with regard to a reference state.

14 Claims, 1 Drawing Sheet

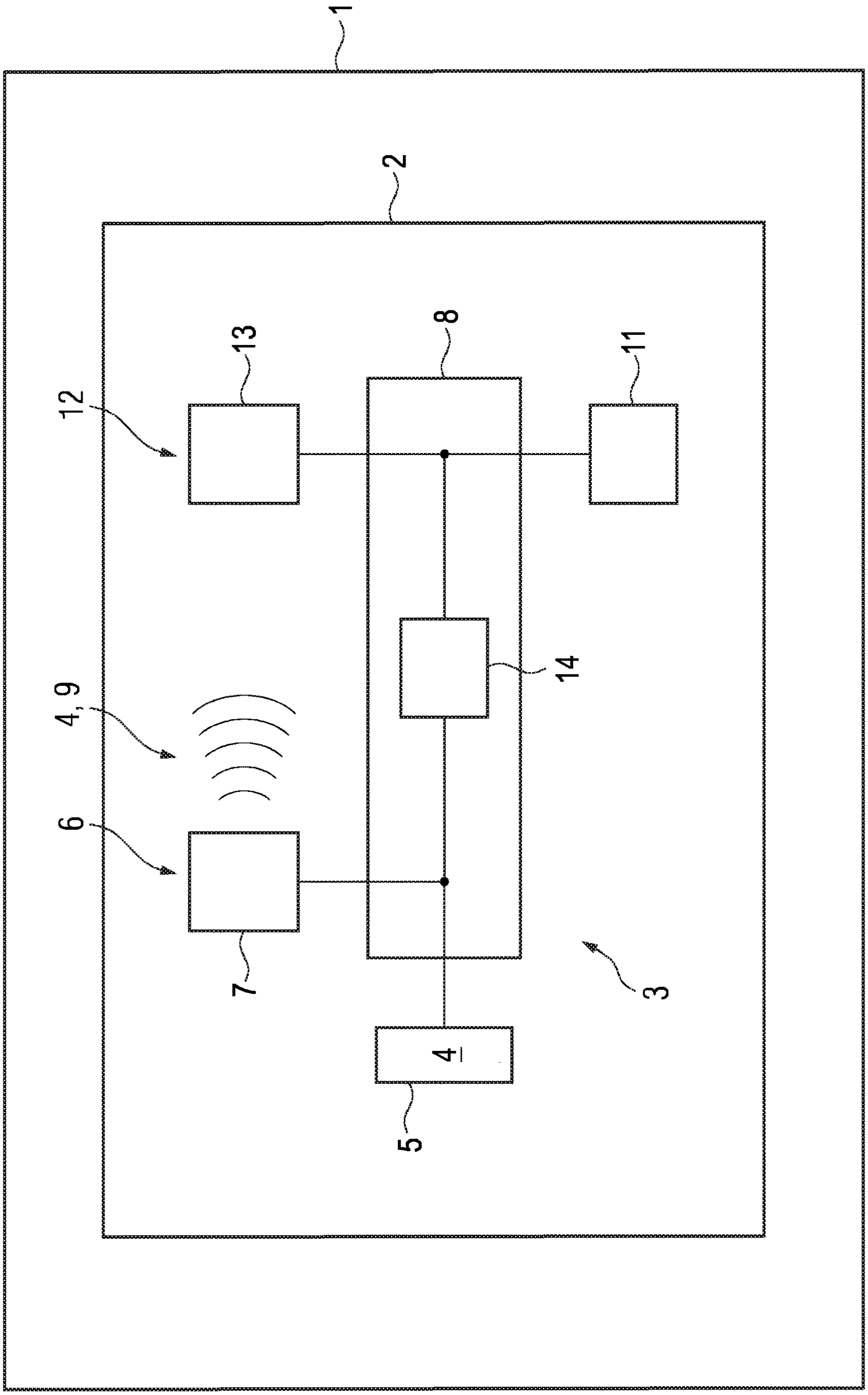
1
2
8
13
11
12
14
4, 9
6
7
3
4
5

VEHICLE, COMPRISING A VEHICLE CABIN DEFINING AN ACOUSTIC SPACE

This application claims priority to U.S. patent application Ser. No. 17/626,091, which was filed on Jan. 10, 2022, which is a National Stage application of Patent Cooperation Treaty application number PCT/EP2019/068601, filed Jul. 10, 2019, the contents of which are incorporated herein by reference in its entirety.

The invention refers to a vehicle, comprising a vehicle cabin defining an acoustic space having specific aurally perceivable properties in a reference state, the vehicle comprising an apparatus for outputting an audio signal in the vehicle cabin.

Respective vehicles comprising a vehicle cabin defining an acoustic space having specific aurally perceivable properties in a reference state, the vehicle comprising an apparatus for outputting or reproducing an audio signal in the vehicle cabin, e.g. implemented by a vehicle audio system, are generally known from prior art.

The acoustic perception of audio signals output or reproduced in a vehicle cabin, the vehicle cabin defining an acoustic space having specific aurally perceivable properties in a reference state, e.g. in an unoccupied state, is essentially determined by the characteristics of the sound reverberation within the vehicle cabin and the acoustic space defined by the vehicle cabin, respectively.

Given the above, there is an ongoing need for technically enhancing the acoustic perception of audio signals output or reproduced in a vehicle cabin though respective apparatuses for outputting or reproducing an audio signal in the vehicle cabin. Such enhancements specifically aim at a simple, yet reliable technical solution for individually modifying the characteristics of the acoustic space defined by the vehicle cabin.

It is the objective of the present invention to provide a vehicle comprising an apparatus for outputting or reproducing an audio signal in the vehicle cabin which allows for enhancing the acoustic perception of audio signals output or reproduced in a vehicle cabin.

This object is achieved by a vehicle according to Claim 1. The Claims depending on Claim 1 refer to possible embodiments of the vehicle.

A first aspect of the invention refers to a vehicle, i.e. particularly a passenger vehicle, such as a car, a truck, a van, etc., the vehicle comprising a vehicle cabin defining an acoustic space having, with regard to the acoustic perception of a person in the vehicle cabin—the term "person" generally refers to any person in the vehicle cabin, such as a driver or co-driver, for instance—, specific aurally perceivable properties in a reference state; as will be apparent form below, the aurally perceivable properties of the acoustic space are essentially defined by the reverberation in the vehicle cabin. The vehicle cabin typically, defines a coherent acoustic space.

The aurally perceivable properties of the acoustic space are typically, (essentially) defined by the spatial dimensions, i.e. particularly the volume, of the vehicle cabin. As such, structural components of the vehicle spatially delimiting the vehicle cabin, such as parts of the vehicle body, typically, define the acoustic space. Yet, structural components of the vehicle disposed in the vehicle cabin, such as seats, trim elements, etc., typically, also define the aurally perceivable properties of the acoustic space and the acoustic space, respectively.

The reference state may refer to a state in which the vehicle cabin is unoccupied, particularly at specific physical conditions, e.g. at a specific temperature and/or at a specific pressure in the vehicle cabin. The acoustic space defined by the vehicle cabin has specific aurally perceivable properties, such as a specific reverberation, in the reference state. The reference state may particularly, refer to a state of the vehicle cabin in which acoustic properties of the (unoccupied) vehicle cabin or parameters relating to the acoustic parameters of the (unoccupied) vehicle cabin, e.g. the room impulse response of the vehicle cabin, reverberation, etc., are measured. The reference state may thus, refer to a tuning or tuned state of the vehicle cabin in which tuning of an apparatus for outputting an audio signal—the term "outputting" is to be understood as outputting as sound or playing back an audio signal—in the vehicle cabin is or has been performed.

The reference state may particularly, refer to a state in which an acoustic impression modifying device of the apparatus is inactive.

The vehicle comprises an apparatus (hereinafter "apparatus") for outputting and/or reproducing an audio signal, e.g. a musical piece, in the vehicle cabin. The apparatus can be implemented as a vehicle audio system or form part of a vehicle audio system.

A respective audio signal may be provided from an audio signal source, e.g. a data carrier device, such as a USB-stick, a radio device, such as a FM radio, a network device, such as a network application (app, browser, etc.), a mobile device, such as a smartphone, smartwatch, tablet, notebook, etc. The apparatus may thus, be connectable or connected with a respective audio signal source.

The apparatus comprises at least one audio outputting device configured to output and/or reproduce at least one audio signal, e.g. a musical piece, in the vehicle cabin. The at least one audio outputting device typically, comprises one or more audio outputting elements, such as loudspeakers. Each audio outputting element may define an acoustic channel of the at least one audio outputting device. Each audio outputting element may be assigned to a specific location or space, i.e. particularly to a specific seat, in the vehicle cabin. The one or more audio outputting elements are typically, arrangeable or arranged so as to output a respective audio signal in the vehicle cabin. The one or more audio outputting elements may be arrangeable or arranged at and/or in structural elements, e.g. instrument panels, pillars, doors, ceiling, etc., of the vehicle. Notably, the one or more audio outputting elements and the at least one audio outputting device, respectively can be standard components of a vehicle audio system implemented by the apparatus. Hence, at least from a structural point of view, the at least one audio outputting device of the apparatus can be a standard audio outputting device of a vehicle audio system.

The apparatus further comprises a hardware- and/or software-embodied acoustic impression modifying device configured to generate an acoustic space modification signal allowing for modifying the aurally perceivable properties of the acoustic space defined by the vehicle cabin, particularly with regard to a reference state. The at least one acoustic impression modifying device is thus, configured to generate acoustic space modification signal which, when output in the vehicle cabin through the at least one audio outputting device, allows for artificially modifying the aurally perceivable properties of the acoustic space defined by the vehicle cabin with regard to a reference state. A respective acoustic space modification signal thus, allows for artificially modifying the aurally perceivable properties of the acoustic space defined by the vehicle cabin with regard to a reference state. In other words, the aurally perceivable properties of the acoustic space defined by the vehicle cabin differ from the aurally perceivable properties of the acoustic space defined by the vehicle cabin in the reference state when a respective acoustic space modification signal is or has been output in the vehicle cabin. As indicated above, the different aurally perceivable properties of the acoustic space defined by the vehicle cabin generated by outputting a respective acoustic space modification signal in the vehicle cabin may particularly, result from a different reverberation or different reverberation characteristics in the vehicle cabin which has/have been created by outputting a respective acoustic space modification signal in the vehicle cabin.

The apparatus thus, allows for outputting or reproducing an audio signal in the vehicle cabin with the option of enhancing, i.e. particularly modifying, the acoustic perception of audio signals output or reproduced in the vehicle cabin.

As will be more apparent from below, an acoustic space modification signal may be a reverberation signal allowing for artificially modifying the reverberation properties of the acoustic space defined by the vehicle cabin with regard to the reference state.

A acoustic space modification signal may be output separately or in combination with other audio signals. Thus, a respective acoustic space modification signal can also be mixed to an audio signal, e.g. a musical piece, which is outputtable or output in the vehicle cabin such that a mixed audio signal including one or more original audio signals and one or more acoustic space modification signals is generated and output in the vehicle cabin.

The acoustic impression modifying device may be configured to modify the aurally perceivable properties of the acoustic space defined by the vehicle cabin from the reference state to a target state. The target state can be generally understood as a state in which the aurally perceivable properties of the acoustic space defined by the vehicle cabin differ from the aurally perceivable properties of the acoustic space defined by the vehicle cabin in the reference state.

The or a target state may particularly, refer to specific aurally perceivable properties of an acoustic space different from the aurally perceivable properties of the acoustic space defined by the vehicle cabin in the reference state. As such, the acoustic impression modifying device allows for changing the aurally perceivable properties of the vehicle cabin compared with the reference state which allows for creating the acoustic impression that a person is not located in the vehicle cabin but in a different acoustic environment.

The target state may particularly, refer to specific aurally perceivable properties of a specific part of a specific acoustic environment, particularly of a specific building, for instance. As such, the acoustic impression modifying device allows for changing the aurally perceivable properties of the vehicle cabin compared with the reference state which allows for creating the acoustic impression that a person is not located in the vehicle cabin but in a specific part of specific acoustic environment, such as a in specific building, such as a church, opera house, music club, etc., and/or in a specific part of a specific building, such as an orchestra pit, receiving studio, rehearsal room, etc. Yet, a specific acoustic environment may also refer to specific environments in a specific building but also to specific environments in nature, such as in a cave, in a desert, in a forest, etc.

The vehicle may comprise a storage device, i.e. typically a data storage device, such as a memory, which is configured to store or stores, particularly pre-defined, aurally perceivable properties of at least one target state allowing for generating acoustic space modification signals that modify the aurally perceivable properties of the acoustic space defined by the vehicle cabin so as to generate the respective target state. As such, the acoustic impression modifying device can use one or more aurally perceivable properties of at least one target state stored in a respective storage device for generating one or more modification signals allowing for modifying the aurally perceivable properties of the acoustic space defined by the vehicle cabin so as to generate or obtain a respective target state. This may save computational resources of the acoustic impression modifying device because the acoustic impression modifying device can use stored acoustically perceivable properties from the storage device that generate a respective target state, such that it is not required to create respective acoustically perceivable properties.

Respective aurally perceivable properties of at least one target state may be stored in the storage device in categorized manner, i.e. with allocated categories. Respective categories may refer to parameters of a specific acoustic environment, such as of a specific building, e.g. building-related parameters, such as building time, building location, etc., venue-related parameters, such as opera house, concert house, music club, etc., which can be chosen by a person—or generally by a user—so as to select a desired target state. As an example, the person may choose parameters such as building time, building location, so as to select e.g. the acoustic environment in a French church built in the $12^{th}$ century as a target state such that one or more aurally perceivable properties of respective French churches are offerable or offered to the person for selection through a user interface, such as touch screen, for instance.

A respective storage device may be structurally assignable or assigned to the acoustic impression modifying device. Yet, it is also conceivable that the or a respective storage device may only be functionally assignable or assigned to the acoustic impression modifying device. In this case, the vehicle may comprise a communication device allowing for communicating with an external data storage device storing aurally perceivable properties of at least one target state and related acoustic space modification signals allowing for modifying the aurally perceivable properties of the acoustic space defined by the vehicle cabin so as to generate the respective target state via a wired or wireless communication link. A respective communication link can generally be established by a wired or wireless communication connection. Exemplary, wireless communication connections are Bluetooth-connections, Wifi-connections, etc.

As indicated above, an acoustic space modification signal may be a reverberation signal allowing for modifying the reverberation properties of the acoustic space defined by the vehicle cabin, particularly with regard to the reference state. As such, a respective reverberation signal may add reverberation to an audio signal, e.g. a musical piece, which is to be output in the vehicle cabin via the at least one audio outputting device. As such, a respective reverberation signal allows for artificially modifying the aurally perceivable properties of the acoustic space defined by the vehicle cabin with regard to a reference state by artificially changing the reverberation properties of the acoustic space defined by the vehicle cabin, i.e. by artificially increasing the reverberation properties (adding reverberation) of the acoustic space defined by the vehicle cabin. The at least one acoustic impression modifying device may thus, be configured to add reverberation to an audio signal which is to be output in the vehicle cabin via the at least one audio outputting device.

Adding reverberation to an audio signal or audio signal component generally, means that the reverberation level of the audio signal is (artificially) increased, particularly by signal processing of the audio signal which adds reverberation, with respect to a reference reverberation level, particularly the original reverberation level of the audio signal.

As indicated above, the at least one audio outputting device may comprise a plurality of audio output channels each allowing for outputting an audio signal or an audio signal component of a specific audio signal in the vehicle cabin. Thereby, the acoustic impression modifying device may be configured to add a first amount of reverberation to or from an audio signal or audio signal component which is to be output through a first audio output channel and to add a second amount of reverberation to or from an audio signal or audio signal component which is to be output through a second audio output channel. In other words, different acoustic channels of the at least one audio outputting device may output audio signals or audio signal components with different reverberation which may result in a multi-dimensional temporally and/or spatially resolved modification of the aurally perceivable properties of the acoustic space defined by the vehicle cabin.

The apparatus may further comprise at least one audio receiving device configured to receive sound, e.g. noise, present in the vehicle cabin, particularly a sound different from an audio signal output in the vehicle cabin. The at least one audio receiving device is particularly, configured to receive sound from an internal and/or external sound source aurally perceivable in the vehicle cabin. The at least one audio receiving device may be embodied as a microphone device, for instance. Examples of respective sound receivable or received by the at least one audio receiving device is a human voice of a person, road sound, engine sound, etc. In other words, the term "sound" does typically, not refer to an audio signal which is to be output or output in the vehicle cabin.

The at least one audio receiving device typically, comprises one or more audio receiving elements, such as microphones. Each audio receiving element may be assigned to a specific location or space, i.e. particularly to at least one specific seat, in the vehicle cabin. The one or more audio receiving elements may be arrangeable or arranged at and/or in structural elements, e.g. instrument panels, pillars, doors, ceiling, etc., of the vehicle so as to receive sound aurally perceivable in the vehicle cabin. Notably, the one or more audio receiving elements and the at least one audio receiving device, respectively can be standard components of a vehicle audio system implemented by the apparatus. Hence, at least from a structural point of view, the at least one audio receiving device of the apparatus can be a standard audio receiving device of a vehicle audio system.

The acoustic impression modifying device may also be configured to add reverberation to sound received by the at least one audio receiving device. Adding reverberation to received sound may significantly improve the effect of modifying the acoustic space in the vehicle cabin because not only the audio signal can be processed with regard to modifying the modifying the acoustic space in the vehicle cabin, particularly by adding reverberation, but also all other kinds of sound present in the vehicle cabin can be received and processed, particularly by adding reverberation, with regard to modifying the acoustic space in the vehicle cabin. Adding reverberation to the received sound means that the reverberation level of the received sound is (artificially) increased, particularly by signal processing of the received sound, with respect to a reference reverberation level, particularly the original reverberation level of the received sound.

The at least one audio outputting device may thus, be also configured to output received sound present in the vehicle cabin with added reverberation.

As such, a respective sound modification signal may also be mixed to received sound which is outputtable or output in the vehicle cabin such that a mixed audio signal including the received sound and the sound modification signal is generated and output in the vehicle cabin. A respective mixed audio signal can also include an audio signal which is to be output or output in the vehicle cabin.

The apparatus may further comprise at least one hardware- and/or software-embodied suppressing device configured to suppress undesired sound in the vehicle cabin, particularly acoustic feedback, generated by receiving an audio signal which is, upon processing, outputtable or output in the vehicle cabin via the at least one audio outputting device and/or by receiving sound present in the vehicle cabin which is, upon processing, outputtable or output in the vehicle cabin via the at least one audio outputting device. As such, undesired sound in the vehicle cabin, particularly acoustic feedback, by receiving an audio signal which is, upon processing, outputtable or output in the vehicle cabin via the at least one audio outputting device and/or by receiving sound present in the vehicle cabin which is, upon processing, outputtable or output in the vehicle cabin via the at least one audio outputting device can be suppressed. The suppression of the undesired sound can be performed with dynamic or static suppression levels ranging from 100% (complete suppression) to 0% (no suppression). Suppressing the signals of the undesired sound may require separating the undesired sound signals from the acoustic signals which are to be output in the vehicle cabin. The suppressing device may be embodied as or comprise one or more suitable filter devices.

Suppressing undesired sound may require determining and/or extracting the respective undesired sound from the acoustic signals which are to be output in the vehicle cabin. The suppressing device may thus, be configured to determine and/or extract the respective sound which is to be suppressed from the acoustic signals which are to be output in the vehicle cabin. This determination and/or extraction may be realized by analyzing the acoustic properties, e.g. the frequency spectrum, of the sound with regard to (characteristic) acoustic properties, e.g. a specific frequency range, which can be assigned to the sound and/or which can be distinguished from acoustic signals not containing the sound, e.g. containing a human voice, instruments, etc. Once determined and/or extracted in respective manner, the sound may be suppressed as specified above.

A second aspect of the invention refers to an apparatus for outputting an audio signal in a vehicle cabin of a vehicle, particularly a vehicle according to the first aspect of the invention. The apparatus comprises at least one audio outputting device configured to output an audio signal in a vehicle cabin; and at least one acoustic impression modifying device configured to generate an acoustic space modification signal allowing for modifying the aurally perceivable properties of an acoustic space defined by a vehicle cabin with regard to a reference state.

All annotations regarding the vehicle of the first aspect of the invention apply mutatis mutandis to the apparatus of the second aspect of the invention.

A third aspect of the invention refers to a method for outputting an audio signal in a vehicle cabin defining an acoustic space having specific aurally perceivable properties in a reference state. The method comprises the step of generating, by an acoustic impression modifying device, an acoustic space modification signal allowing for modifying the aurally perceivable properties of the acoustic space defined by the vehicle cabin with regard to a reference state. The method may further comprise outputting a generated acoustic space modification signal in the or a cabin so as to artificially modify the aurally perceivable properties of the acoustic space defined by the vehicle cabin with regard to the reference state.

All annotations regarding the vehicle of the first aspect of the invention apply mutatis mutandis to the method of the third aspect of the invention.

Exemplary embodiments of the invention are described with reference to the FIGURE, whereby the sole FIGURE shows a principle drawing of a vehicle according to an exemplary embodiment.

The sole FIGURE shows a vehicle 1, e.g. a passenger vehicle, according to an exemplary embodiment.

The vehicle 1 comprises a vehicle cabin 2 defining an acoustic space having, with regard to the acoustic perception of a person (not shown) in the vehicle cabin 2, specific aurally perceivable properties in a reference state. The vehicle cabin 2 typically, defines a coherent acoustic space.

The reference state may refer to a state in which the vehicle cabin 2 is unoccupied, particularly at specific physical conditions, e.g. at a specific temperature and/or at a specific pressure in the vehicle cabin 2. The acoustic space defined by the vehicle cabin 2 has specific aurally perceivable properties, such as a specific reverberation, in the reference state. The reference state may particularly, refer to a state of the vehicle cabin 2 in which acoustic properties of the (unoccupied) vehicle cabin 2 or parameters relating to the acoustic parameters of the (unoccupied) vehicle cabin 2, e.g. the room impulse response of the vehicle cabin, reverberation, etc., are measured. The reference state may thus, refer to a tuning or tuned state of the vehicle cabin 2 in which tuning of an apparatus 3 for outputting an audio signal 4 in the vehicle cabin 2 is or has been performed.

The vehicle comprises an apparatus 3 for outputting and/or reproducing an audio signal 4, e.g. a musical piece, in the vehicle cabin 2. The apparatus 3 can be implemented as a vehicle audio system or form part of a vehicle audio system.

A respective audio signal 4 may be provided from an audio signal source 5, e.g. a data carrier device, such as a USB-stick, a radio device, such as a FM radio, a network device, such as a network application (app, browser, etc.), a mobile device, such as a smartphone, smartwatch, tablet, notebook, etc. The apparatus 3 may thus, be connectable or connected with a respective audio signal source 5.

The apparatus 3 comprises at least one audio outputting device 6 configured to output and/or reproduce at least one audio signal 4, e.g. a musical piece, in the vehicle cabin 2. The audio outputting device 6 comprises one or more audio outputting elements 7, such as loudspeakers. Each audio outputting element 7 may define an acoustic channel of the audio outputting device 6. Each audio outputting element 7 may be assigned to a specific location or space, i.e. particularly to a specific seat, in the vehicle cabin 2. The one or more audio outputting elements 7 are typically, arrangeable or arranged so as to output a respective audio signal 4 in the vehicle cabin 2. The one or more audio outputting elements 7 may be arrangeable or arranged at and/or in structural elements (not shown), e.g. instrument panels, pillars, doors, ceiling, etc., of the vehicle 1. Notably, the one or more audio outputting elements 7 and the audio outputting device 6, respectively can be standard components of a vehicle audio system implemented by the apparatus 3. Hence, at least from a structural point of view, the audio outputting device 6 of the apparatus 3 can be a standard audio outputting device of a vehicle audio system.

The apparatus 3 further comprises a hardware- and/or software-embodied acoustic impression modifying device 8 configured to generate an acoustic space modification signal 9 allowing for modifying the aurally perceivable properties of the acoustic space defined by the vehicle cabin 2 with regard to the reference state. The acoustic impression modifying device 8 is thus, configured to generate acoustic space modification signal 9 which, when output in the vehicle cabin 2 through the audio outputting device 6, allows for artificially modifying the aurally perceivable properties of the acoustic space defined by the vehicle cabin 2 with regard to the reference state. A respective acoustic space modification signal 9 thus, allows for artificially modifying the aurally perceivable properties of the acoustic space defined by the vehicle cabin 2 with regard to the reference state. In other words, the aurally perceivable properties of the acoustic space defined by the vehicle cabin 2 differ from the aurally perceivable properties of the acoustic space defined by the vehicle cabin 2 in the reference state when a respective acoustic space modification signal 9 is or has been output in the vehicle cabin 2. As indicated above, the different aurally perceivable properties of the acoustic space defined by the vehicle cabin 2 generated by outputting a respective acoustic space modification signal 9 in the vehicle cabin 2 may particularly, result from a different reverberation or different reverberation characteristics in the vehicle cabin 2 which has/have been created by outputting a respective acoustic space modification signal 9 in the vehicle cabin 2.

The apparatus 3 thus, allows for outputting or reproducing an audio signal 4 in the vehicle cabin 2 with the option of enhancing, i.e. particularly modifying, the acoustic perception of the audio signal 4 output or reproduced in the vehicle cabin 2.

As will be more apparent from below, an acoustic space modification signal 9 may be a reverberation signal allowing for artificially modifying the reverberation properties of the acoustic space defined by the vehicle cabin 2 with regard to the reference state.

A acoustic space modification signal 9 may be output separately or in combination with other audio signals 4. Thus, a respective acoustic space modification signal 9 can also be mixed to an audio signal 4, e.g. a musical piece, which is outputtable or output in the vehicle cabin 2 such that a mixed audio signal including one or more original audio signals 4 and one or more acoustic space modification signals 9 is generated and output in the vehicle cabin 2.

The acoustic impression modifying device 8 may be configured to modify the aurally perceivable properties of the acoustic space defined by the vehicle cabin 2 from the reference state to a target state. The target state can be generally understood as a state in which the aurally perceivable properties of the acoustic space defined by the vehicle cabin 2 differ from the aurally perceivable properties of the acoustic space defined by the vehicle cabin 2 in the reference state.

The or a target state may thus, refer to specific aurally perceivable properties of an acoustic space different from the aurally perceivable properties of the acoustic space defined by the vehicle cabin 2 in the reference state. As such, the acoustic impression modifying device 8 allows for changing the aurally perceivable properties of the vehicle cabin 2 compared with the reference state which allows for creating the acoustic impression that a person is not located in the vehicle cabin 2 but in a different acoustic environment.

The target state may particularly, refer to specific aurally perceivable properties of a specific part of a specific acoustic environment, particularly of a specific building, for instance. As such, the acoustic impression modifying device 8 allows for changing the aurally perceivable properties of the vehicle cabin 2 compared with the reference state which allows for creating the acoustic impression that a person is not located in the vehicle cabin 2 but in a specific part of specific acoustic environment, such as a in specific building, such as a church, opera house, music club, etc., and/or in a specific part of a specific building, such as an orchestra pit, receiving studio, rehearsal room, etc. Yet, a specific acoustic environment may also refer to specific environments in a specific building but also to specific environments in nature, such as in a cave, in a desert, in a forest, etc.

The vehicle 1 may comprise a storage device 11, i.e. typically a data storage device, such as a memory, which is configured to store or stores, particularly pre-defined, aurally perceivable properties of at least one target state and related acoustic space modification signals 9 allowing for modifying the aurally perceivable properties of the acoustic space defined by the vehicle cabin 2 so as to generate the respective target state. As such, the acoustic impression modifying device 8 can use one or more aurally perceivable properties of at least one target state and related acoustic space modification signals 9 stored in a respective storage device 11 for generating one or more modification signals 9 allowing for modifying the aurally perceivable properties of the acoustic space defined by the vehicle cabin 1 so as to generate a respective target state. This may save computational resources of the acoustic impression modifying device 8 because the acoustic impression modifying device 8 can use stored acoustic space modification signals 9 from the storage device 11 for generating a respective target state such that it is not required to create respective acoustic space modification signals 9 through the acoustic impression modifying device 8 without actually creating such acoustic space modification signals 9.

Respective aurally perceivable properties of at least one target state and related acoustic space modification signals 9 may be stored in the storage device 11 in categorized manner, i.e. with allocated categories. Respective categories may refer to parameters of a specific acoustic environment, such as of a specific building, e.g. building-related parameters, such as building time, building location, etc., venue-related parameters, such as opera house, concert house, music club, etc., which can be chosen by a person—or generally by a user—so as to select a desired target state. As an example, the person may choose parameters such as building time, building location, so as to select e.g. the acoustic environment in a French church built in the $12^{th}$ century as a target state such that one or more aurally perceivable properties and related acoustic space modification signals 9 of respective French churches are offerable or offered to the person for selection through a user interface, such as touch screen, for instance.

A respective storage device 11 may be structurally assignable or assigned to the acoustic impression modifying device 8. Yet, it is also conceivable that the or a respective storage device 11 may only be functionally assignable or assigned to the acoustic impression modifying device 8. In this case, the vehicle 1 may comprise a communication device (not explicitly shown) allowing for communicating with an external data storage device 11 storing aurally perceivable properties of at least one target state and related acoustic space modification signals 9 allowing for modifying the aurally perceivable properties of the acoustic space defined by the vehicle cabin 2 so as to generate the respective target state via a wired or wireless communication link. A respective communication link can generally be established by a wired or wireless communication connection. Exemplary, wireless communication connections are Bluetooth-connections, Wifi-connections, etc.

As indicated above, an acoustic space modification signal 9 may be a reverberation signal allowing for modifying the reverberation properties of the acoustic space defined by the vehicle cabin 2, particularly with regard to the reference state. As such, a respective reverberation signal may add reverberation to an audio signal 4, e.g. a musical piece, which is to be output in the vehicle cabin 2 via the audio outputting device 6. As such, a respective reverberation signal allows for artificially modifying the aurally perceivable properties of the acoustic space defined by the vehicle cabin 2 with regard to a reference state by artificially changing the reverberation properties of the acoustic space defined by the vehicle cabin 2, i.e. by artificially increasing the reverberation properties (adding reverberation) of the acoustic space defined by the vehicle cabin 2. The acoustic impression modifying device 8 may thus, be configured to add reverberation to an audio signal 4 which is to be output in the vehicle cabin 2 via the at least one audio outputting device 6.

Adding reverberation to an audio signal 4 or audio signal component generally, means that the reverberation level of the audio signal 4 is (artificially) increased, particularly by signal processing of the audio signal 4 which adds reverberation, with respect to a reference reverberation level, particularly the original reverberation level of the audio signal 4.

As indicated above, the audio outputting device 6 may comprise a plurality of audio output channels each allowing for outputting an audio signal 4 or an audio signal component of a specific audio signal 4 in the vehicle cabin 2. Thereby, the acoustic impression modifying device 8 may be configured to add a first amount of reverberation to or from an audio signal 4 or audio signal component which is to be output through a first audio output channel and to add a second amount of reverberation to or from an audio signal 4 or audio signal component which is to be output through a second audio output channel. In other words, different acoustic channels of the audio outputting device 6 may output audio signals 4 or audio signal components with different reverberation which may result in a multi-dimensional temporally and/or spatially resolved modification of the aurally perceivable properties of the acoustic space defined by the vehicle cabin 2.

The apparatus 3 may comprise a receiving device 12 configured to receive sound present in the vehicle cabin 2, particularly a sound different from an audio signal 4 output in the vehicle cabin 2. The audio receiving device 12 is particularly, configured to receive sound from an internal and/or external sound source aurally perceivable in the vehicle cabin 2. Examples of respective sound receivable or received by the audio receiving device 12 is a human voice of a person, road sound, engine sound, etc. In other words, the term "sound" does typically, not refer to an audio signal 4 which is to be output or output in the vehicle cabin 2.

The audio receiving device 12 comprises one or more audio receiving elements 13, such as microphones. Each audio receiving element 13 may be assigned to a specific location or space, i.e. particularly to at least one specific seat, in the vehicle cabin 2. The one or more audio receiving elements 13 may be arrangeable or arranged at and/or in structural elements, e.g. instrument panels, pillars, doors, ceiling, etc., of the vehicle 1 so as to receive sound aurally perceivable in the vehicle cabin 2. Notably, the one or more audio receiving elements 13 and the audio receiving device 12, respectively can be standard components of a vehicle audio system implemented by the apparatus 3. Hence, at least from a structural point of view, the audio receiving device 12 of the apparatus 3 can be a standard audio receiving device of a vehicle audio system.

The acoustic impression modifying device 8 may also be configured to add reverberation to sound received by the audio receiving device 12. Adding reverberation to received sound may significantly improve the effect of modifying the acoustic space in the vehicle cabin 2 because not only the audio signal 4 can be processed with regard to modifying the modifying the acoustic space in the vehicle cabin 2, particularly by adding reverberation, but also all other kinds of sound present in the vehicle cabin 2 can be received and processed, particularly by adding reverberation, with regard to modifying the acoustic space in the vehicle cabin 2. Adding reverberation to the received sound means that the reverberation level of the received sound is (artificially) increased, particularly by signal processing of the received sound, with respect to a reference reverberation level, particularly the original reverberation level of the received sound.

The audio outputting device 6 may thus, be also configured to output received sound present in the vehicle cabin 2 with added reverberation.

As such, a respective sound modification signal 9 may also be mixed to received sound which is outputtable or output in the vehicle cabin 2 such that a mixed audio signal including the received sound and the sound modification signal 9 is generated and output in the vehicle cabin 2. A respective mixed audio signal can also include an audio signal 4 which is to be output or output in the vehicle cabin 2.

The apparatus 3 may further comprise a hardware- and/or software-embodied suppressing device 14 configured to suppress undesired sound in the vehicle cabin 2, particularly acoustic feedback, generated by receiving an audio signal 4 which is, upon processing, outputtable or output in the vehicle cabin 2 via the audio outputting device 6 and/or by receiving sound present in the vehicle cabin 2 which is, upon processing, outputtable or output in the vehicle cabin 2 via the audio outputting device 6. As such, undesired sound in the vehicle cabin 2, particularly acoustic feedback, by receiving an audio signal 4 which is, upon processing, outputtable or output in the vehicle cabin 2 via the audio outputting device 6 and/or by receiving sound present in the vehicle cabin 2 which is, upon processing, outputtable or output in the vehicle cabin 2 via the audio outputting device 6 can be suppressed. The suppression of the undesired sound can be performed with dynamic or static suppression levels ranging from 100% (complete suppression) to 0% (no suppression). Suppressing the signals of the undesired sound may require separating the undesired sound signals from the acoustic signals 4 which are to be output in the vehicle cabin 2. The suppressing device 14 may be embodied as or comprise one or more suitable filter devices.

Suppressing undesired sound may require determining and/or extracting the respective undesired sound from the acoustic signals 4 which are to be output in the vehicle cabin 2. The suppressing device 14 may thus, be configured to determine and/or extract the respective sound which is to be suppressed from the acoustic signals 4 which are to be output in the vehicle cabin 2. This determination and/or extraction may be realized by analyzing the acoustic properties, e.g. the frequency spectrum, of the sound with regard to (characteristic) acoustic properties, e.g. a specific frequency range, which can be assigned to the sound and/or which can be distinguished from acoustic signals 4 not containing the sound, e.g. containing a human voice, instruments, etc. Once determined and/or extracted in respective manner, the sound may be suppressed as specified above.

The apparatus allows for implementing a method for outputting an audio signal 4 in a vehicle cabin 2 defining an acoustic space having specific aurally perceivable properties in a reference state. The method comprises the step of generating, by an acoustic impression modifying device 8, an acoustic space modification signal 9 allowing for modifying the aurally perceivable properties of the acoustic space defined by the vehicle cabin 2 with regard to a reference state. The method may further comprise outputting a generated acoustic space modification signal 9 in the vehicle cabin 2 so as to artificially modify the aurally perceivable properties of the acoustic space defined by the vehicle cabin 2 with regard to the reference state.

The invention claimed is:

1. Apparatus for outputting an audio signal in a vehicle cabin, the apparatus comprises:

an acoustic impression modifying device configured to generate an acoustic space modification signal allowing for modifying the aurally perceivable properties of an acoustic space, wherein the vehicle cabin defines the acoustic space having specific aurally perceivable properties; and at least one audio receiving device configured to receive a sound present in the vehicle cabin, wherein the received sound is a sound different from an audio signal output in the vehicle cabin, wherein the acoustic impression modifying device is configured to add reverberation to the received sound present in the vehicle cabin, and wherein the apparatus is configured to output the received sound with added reverberation independently from an audio signal output in the vehicle cabin.

2. Apparatus according to claim 1, wherein the acoustic impression modifying device is configured to modify the aurally perceivable properties of the acoustic space defined by the vehicle cabin from a reference state to a target state.

3. Apparatus according to claim 2, wherein the target state refers to specific aurally perceivable properties of an acoustic space different from the aurally perceivable properties of the acoustic space defined by the vehicle cabin in the reference state.

4. Apparatus according to claim 3, wherein the target state refers to specific aurally perceivable properties of a specific part of a specific acoustic environment.

5. Apparatus according to claim 1, comprising a storage device configured to store aurally perceivable properties of at least one target state and related modification signals allowing for modifying the aurally perceivable properties of the acoustic space defined by the vehicle cabin so as to generate the respective target state.

6. Apparatus according to claim 1, wherein the modification signal is a reverberation signal allowing for modifying the reverberation properties of the acoustic space defined by the vehicle cabin.

7. Apparatus according to claim 1, wherein the acoustic impression modifying device is configured to add reverberation to an audio signal which is to be output in the vehicle cabin via the at least one audio outputting device.

8. Apparatus according to claim 1, wherein the acoustic impression modifying device is configured to add reverberation to the received sound present in the vehicle cabin.

9. Apparatus according to claim 1, further comprising at least one audio output device, wherein the at least one audio outputting device is configured to output received sound present in the vehicle cabin with the added reverberation.

10. Apparatus according to claim 9, wherein the at least one audio outputting device comprises a plurality of audio output channels each allowing for outputting an audio signal or an audio signal component of a specific audio signal in the vehicle cabin, whereby the acoustic impression modifying device is configured to add a first amount of reverberation to or from an audio signal or audio signal component which is to be output through a first audio output channel and to add a second amount of reverberation to or from an audio signal or audio signal component which is to be output through a second audio output channel.

11. Apparatus according to claim 9, further comprising a suppressing device configured to suppress undesired acoustic sound in the vehicle cabin, particularly acoustic feedback generated from receiving sound present in the vehicle cabin and/or from receiving the audio signal which is outputtable or output in the vehicle cabin via the at least one audio outputting device.

12. Apparatus according to claim 2, wherein the reference state refers to a state of an unoccupied vehicle cabin, particularly at specific physical conditions, particularly specific temperature and/or pressure in the vehicle cabin.

13. Vehicle, comprising an apparatus according to claim 1.

14. Method for outputting an audio signal in a vehicle cabin defining an acoustic space having specific aurally perceivable properties, the method comprising the steps of:

generating, by an acoustic impression modifying device, an acoustic space modification signal allowing for modifying the aurally perceivable properties of the acoustic space defined by the vehicle cabin;

receiving, via at least one audio receiving device, a sound present in the vehicle cabin, wherein the received sound is a sound different from an audio signal output in the vehicle cabin;

adding, via the acoustic impression modifying device, reverberation to the received sound present in the vehicle cabin; and outputting the received sound with added reverberation independently from an audio signal output in the vehicle cabin.

* * * * *